3,597,455
PROCESS FOR MANUFACTURE OF
STERILE LECITHIN
Arnold Arons, Highland Park, Lewis Cowen, North Plainfield, and Friedrich Dursch, Freehold, N.J., assignors to E. R. Squibb & Sons, Inc., New York, N.Y.
No Drawing. Filed May 29, 1969, Ser. No. 829,130
Int. Cl. C07f 9/02; A23j 7/00
U.S. Cl. 260—403                10 Claims

ABSTRACT OF THE DISCLOSURE

Sterile lecithin is obtained by subjecting a solution of lecithin in a non-aqueous solvent to a sterile filtration followed by lyophilization of the filtrate.

BACKGROUND OF THE INVENTION

The present invention relates to the sterilization of lecithin, and more particularly, to a method for obtaining sterile lecithin by lyophilization of a non-aqueous lecithin solution.

Lecithin is an organic chemical compound, phospholipid in nature, which is used in pharmaceutical practice as a dispersant and surface active agent. In view of the "natural" character of lecithin, it has for many years been used as a dispersant in sterile aqueous suspensions of procaine penicillin. Modern medical practice dictates that very large doses of procaine penicillin be injected in order to achieve a good therapeutic response. When 50% micronized penicillin solids are formulated into an aqueous suspension, the resultant mixture is so thick that it will not flow out of a syringe. The addition of relatively small quantities of sterile lecithin fluidizes this mixture, and permits the injection of high doses.

The preparation of sterile lecithin has always presented a problem to the pharmaceutical industry. The choice of a method for preparing sterile lecithin is severely limited by the physical properties of this material. Lecithin is a waxy, sticky solid that tends to adhere to processing equipment, forms emulsions in aqueous systems and is quite plastic under pressure. The fact that sterile lecithin is available only at a premium price shows the lack of an economical process for its sterilization.

It is, accordingly, an object of the present invention to provide an improved process for preparing sterile lecithin. A further object is to provide an economical process for preparing sterile lecithin. Another object is to provide a process which overcomes the difficulties heretofore encountered in processing lecithin. These and other objects of the persent invention will be apparent from the following description.

SUMMARY OF THE INVENTION

It has now been found that sterile lecithin may be obtained by subjecting a solution of lecithin in a non-aqueous solvent to a sterile filtration followed by lyophilization of the filtrate.

The first requirement for the process of the present invention is that the solvent be one in which the lecithin is sufficiently soluble to permit sterilization of the solution by filtration through appropriate filter media. The lecithin should be soluble in the solvent to the extent of at least 1 part by weight per 10 parts by weight of solvent. A second requirement is removal of the solvent under sterile conditions while isolating the lecithin in a useful physical form.

Some examples of solvents useful according to the present invention are chlorinated hydrocarbons, esters, tetrahydrofuran, benzene, and pyridine. Some specific chlorinated hydrocarbons which may be used are methylene chloride, chloroform, carbon tetrachloride and 1,1,1-trichloroethane. Suitable esters are isobutyl acetate, methyl acetate and ethyl acetate. Water, lower alcohols, ketones, dimethylformamide, aliphatic hydrocarbons, are not suitable due to the limited solubility of lecithin therein.

Because of the physical properties of lecithin, removal of solvent by simple distillation of the lecithin solution is impractical. Precipitation from solution, e.g. by dilution with a second solvent or by cooling does not yield a material which can be isolated easily by such conventional means as, e.g. filtration or centrifugation. Solvent removal by lyophilization, however, produces a sterile lecithin of desirable physical properties, i.e. as a free-flowing solid.

According to the present invention, the lecithin is dissolved in an organic solvent. The solution is then subjected to a sterilizing filtration through appropriate filter media. The resulting sterile solution of lecithin may be lyophilized by freezing the solution and subsequent removal of the solvent by vacuum sublimation to yield a free-flowing sterile lecithin.

A further embodiment of the invention is to add water to the sterile lecithin solution before lyophilization to produce a stable solvent-in-water emulsion in the case of a water-immiscible solvent, or an emulsion of lecithin in the case of a water soluble solvent. In either case the solvent-water mixture may be lyophilized to yield a free-flowing sterile lecithin. According to a further embodiment, all or part of the solvent may be removed from the lecithin emulsion, e.g. by flash distilling, before lyophilizing.

The following examples illustrate the present invention without, however, limiting the same thereto.

EXAMPLE 1

Crude commercial lecithin (100 grams) is agitated at room temperature with 1,1,1-trichloroethane (0.2 liter) until a turbid solution is formed. Filter aid (Hyflo Super-Cel; 5 grams) is added and the mixture is pre-filtered through a medium porosity filter pad. The filtrate is subsequently pressure filtered through a $0.22\mu$ Millipore "Solvinert" membrane into a previously sterilized container. The sterile filtrate is then shell-frozen in a Dry-Ice bath and is lyophilized in the conventional manner. Sterile lecithin (88 grams) free from residual solvents is obtained.

EXAMPLE 2

A sterile filtered solution of lecithin in 1,1,1-trichloroethane (1 volume) prepared as described in Example 1 is added with rapid agitation to pyrogen-free water (4 volumes). An emulsion is formed that is lyophilized under sterile conditions. Sterile lecithin (85 grams) is obtained as a free-flowing powder.

EXAMPLE 3

Crude commercial lecithin (100 grams) is agitated at room temperature with tetrahydrofuran (0.2 liter) until a turbid solution is formed. This solution is filtered through a precoated medium porosity filter pad. The resulting solution is then pressure filtered through a $0.22\mu$ Millipore "Solvinert" membrane into a previously sterilized container. The sterile filtrate is added with rapid agitation to pyrogen-free water (1.0 liter) whereby a stable emulsion is formed. This emulsion is lyophilized to yield sterile lecithin (90 grams) as a free-flowing powder.

EXAMPLE 4

A sterile solution of lecithin is tetrahydrofuran (1 volume), prepared as described in Example 3, is added with rapid agitation to pyrogen-free water (3 volumes). The resulting emulsion is flash distilled under sterile conditions until most of the tetrahydrofuran is removed. The residual thick liquid is lyophilized in conventional manner to furnish sterile lecithin (88 grams) as a free-flowing granular material.

EXAMPLE 5

Crude lecithin (50 grams) is shaken with benzene (0.15 liter) at room temperature until a turbid solution is formed. Filter aid (5 grams) is added to this solution and the mixture is clarified by passage through a medium porosity filter pad. The filtrate is subsequently sterilized by pressure filtration through an unglazed porcelain filter stone into a previously sterilized container. The filtrate is frozen in an ice-bath under sterile conditions and the benzene is removed by vacuum sublimation in a commercial freeze-drier. Sterile lecithin (43 grams) is obtained as a solvent-gree granular solid.

EXAMPLE 6

Crude lecithin (100 grams) is dissolved in chloroform (0.25 liter) by agitation at room temperature. The turbid solution is clarified by centrifugation on a batch centrifuge. The clear supernate is sterilized by filtration through a $0.22\mu$ Millipore "Solvinert" membrane and the filtrate is stirred into pyrogen-free water (1 liter). The resulting sterile emulsion is shell frozen and the solvents are removed by lyophilization. Sterile lecithin (78 grams) is obtained as a free-flowing powder.

EXAMPLE 7

A sterile solution of lecithin in isobutyl acetate is prepared by substitution of isobutyl acetate for tetrahydrofuran in Example 3. This solution is added to pyrogen-free water (4 volumes) and the resulting emulsion is vacuum distilled under sterile conditions until all the isobutyl acetate is removed as its azeotrope with water. The residual aqueous lecithin emulsion is frozen and the water is removed by lyophilization. Sterile lecithin (84 grams) is obtained as a free-flowing solid.

What is claimed is:
1. A process for preparing sterile lecithin which comprises lyophilizing a sterile solution of lecithin.
2. A process according to claim 1 wherein the lecithin solution is rendered sterile by filtration before lyophilizing.
3. A process according to claim 1 wherein the solvent for the lecithin solution is a non-aqueous solvent wherein the lecithin has a solubility at room temperature of at least about 1 part per 10 parts of solvent.
4. A process according to claim 1 wherein water is added to the sterile solution of lecithin to form an emulsion before lyophilization.
5. A process according to claim 3 wherein the solvent is immiscible with water.
6. A process according to claim 3 wherein the solvent is miscible with water.
7. A process according to claim 5 wherein the addition of water to the solution of lecithin and water-immiscible solvent forms a solvent-in-water emulsion.
8. A process according to claim 6 wherein the addition of water to the solution of lecithin and water-miscible solvent produces an emulsion of lecithin in the solvent-water mixture.
9. A process according to claim 4 wherein a part of the solvent is removed from the emulsion under sterile conditions before lyophilizing.
10. A process according to claim 1 wherein a part of the solvent is removed by flash distillation.

References Cited
UNITED STATES PATENTS 2,686,190    8/1954    Myers _____ 260—403

ELBERT L. ROBERTS, Primary Examiner